United States Patent [19]

Sandstrom et al.

[11] Patent Number: 5,739,198
[45] Date of Patent: Apr. 14, 1998

[54] RUBBER COMPOSITION AND TIRE WITH TREAD THEREOF

[75] Inventors: Paul Harry Sandstrom, Tallmadge; William Paul Francik, Bath; David John Zanzig, Uniontown, all of Ohio

[73] Assignee: The Goodyear Tire & Rubber Company, Akron, Ohio

[21] Appl. No.: 684,780

[22] Filed: Jul. 22, 1996

Related U.S. Application Data

[63] Continuation-in-part of Ser. No. 618,007, Mar. 18, 1996, abandoned.

[51] Int. Cl.$^6$ ............................................. C08K 3/34
[52] U.S. Cl. ................................. 524/493; 524/495
[58] Field of Search ................................ 524/493, 495

[56] References Cited

U.S. PATENT DOCUMENTS

| | | | |
|---|---|---|---|
| 4,690,965 | 9/1987 | Hirata et al. | 524/236 |
| 5,336,730 | 8/1994 | Sandstrom et al. | 525/332.6 |
| 5,430,087 | 7/1995 | Carlson et al. | 524/496 |

*Primary Examiner*—Melvyn I. Marquis
*Attorney, Agent, or Firm*—Henry C. Young, Jr.

[57] ABSTRACT

The present invention relates to a rubber composition reinforced with a combination of silica and defined carbon black and to pneumatic tires having treads comprised of such rubber composition. The reinforced rubber composition comprises in one aspect, at least one elastomer, defined carbon black, precipitated silica and at least one silica coupling agent.

16 Claims, 1 Drawing Sheet

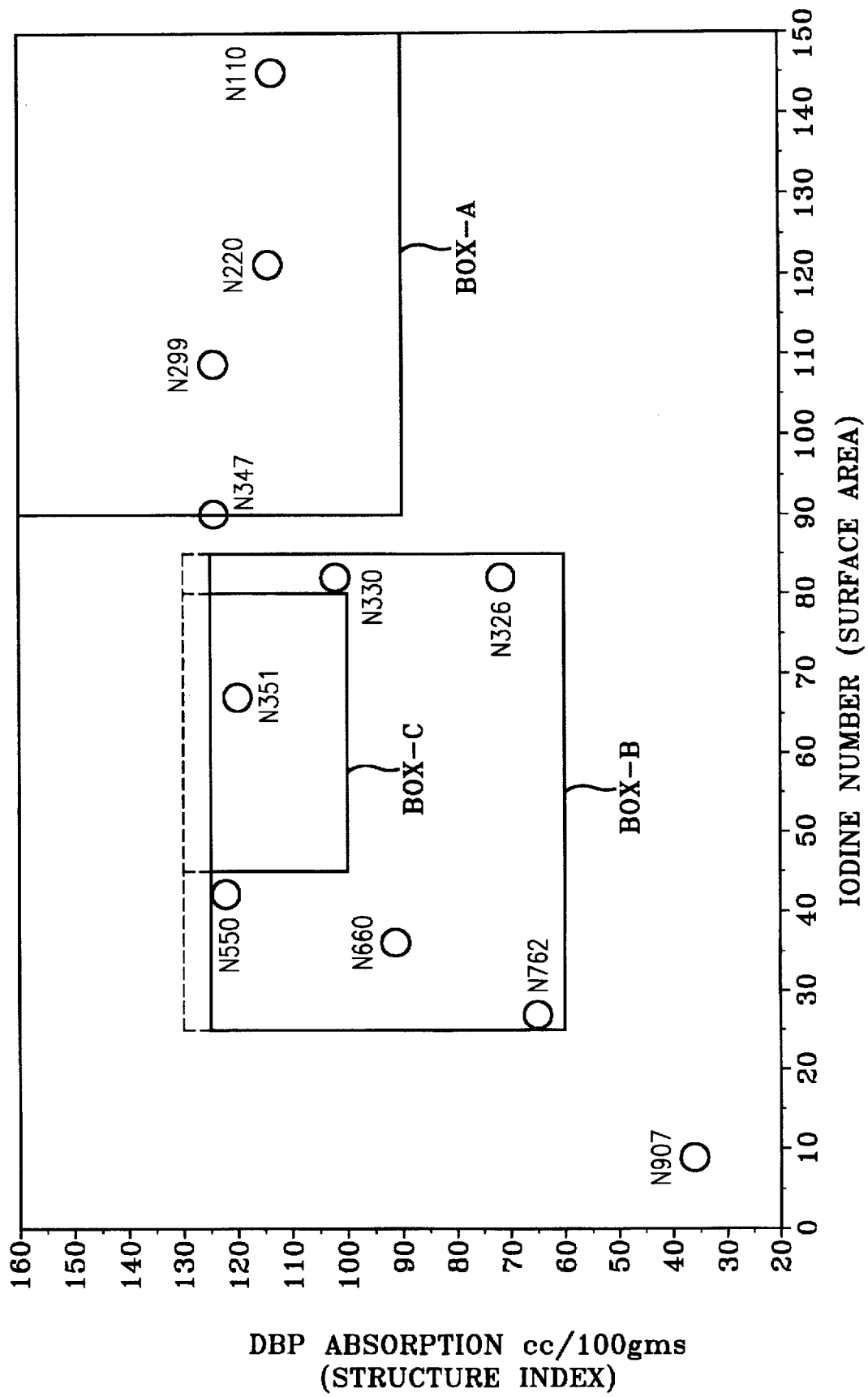

5,739,198

RUBBER COMPOSITION AND TIRE WITH TREAD THEREOF

This is a continuation-in-part of application Ser. No. 618,007, filed Mar. 18, 1996, now abandoned.

FIELD

This invention relates to rubber compositions which are reinforced with a combination of silica and defined carbon black, together with a silica coupler for the silica, and to tires with treads thereof.

In one aspect, the rubber composition is comprised of at least one diene based, sulfur curable elastomer reinforced with precipitated silica and defined carbon black together with at least one silica coupling agent.

BACKGROUND

Rubber compositions are typically used for tire treads which may be optimized for various rubber composition properties to promote three tire properties, namely, traction, rolling resistance and treadwear.

Silica is sometimes used as reinforcement for tire tread rubber. A silica coupler is usually used to couple the silica to the elastomer(s) for reinforcement purposes. Sometimes the silica is used in minor amounts (eg. less than 20 phr) in combination with larger amounts of carbon black. Sometimes, the silica may be the primary, or major, reinforcement in the tire tread rubber composition for reduced tire rolling resistance purposes.

However, it is disadvantageous to use silica as a primary reinforcement for the rubber composition of a tire tread, as compared to carbon black reinforcement, primarily because of its (i) substantially increased material cost and (ii) substantially reduced electrical conductivity.

However, for some tire applications, it remains desirable to use silica as reinforcement for tire treads, sometimes in a quantitative amount.

Accordingly, it is desired herein to provide an alternative rubber composition for tire tread applications which would normally use a substantial amount of silica reinforcement, with rubber compositions having comparable physical properties yet having one or more of (i) reduced silica material costs and (ii) increased electrical conductivity.

In this regard, typically desirable physical properties for tire tread rubber compositions may include, for example, hardness, modulus, hysteresis as indicated by rebound properties, tangent delta (Tan. delta) at 0° C., and abrasion resistance as indicated by DIN abrasion values. Such physical properties are well known to those having skill in the rubber compounding art and are considered to be predictive of tire tread performance.

The term "phr" if used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

SUMMARY AND PRACTICE OF THE INVENTION

In accordance with this invention, a rubber composition is provided which comprises (A) 100 parts by weight of at least one diene-based elastomer, (B) about 50 to about 100, alternatively about 60 to about 90 phr particulate reinforcing filler composed of silica and carbon black wherein said filler is comprised of (i) about 25 to about 50, alternatively about 30 to about 45, phr of precipitated silica and (ii) about 25 to about 50, alternatively about 30 to about 45, phr particulate carbon black wherein said carbon black has a DBP absorption value in a range of 60 to 130, preferably to 125, cc/100 gm with a corresponding Iodine Adsorption Number in a range of about 25 to about 85 g/kg, preferably a DBP absorption value in a range of about 100 to 130, preferably to 125, cc/100 gm with a corresponding Iodine Adsorption Number in a range of about 45 to about 80 g/kg, and (C) a coupling agent composition having a moiety characterized by being reactive with the surface of the silica and another moiety characterized by being interactive with diene-based elastomers, namely, elastomers having carbon-to-carbon double bonds.

It is understood that the DBP (dibutylphthalate) absorption values may be determined by ASTM test D2414 and the Iodine Number may be determined by ASTM test D1510.

In the practice of this invention, it is considered herein to be usually preferable for the weight ratio of the coupling agent to silica to be in a range of about 0.01/1 to about 0.2/1 or even up to about 0.25/1.

In the practice of this invention, it is preferable that the weight ratio of silica to carbon black is in a range of about 1/2 to about 2/1.

A real benefit for this invention can be envisioned in effecting one or more of (i) silica cost reduction and (ii) increased electrical conductivity for a rubber composition. Such benefit(s) is(are) directed to rubber compositions which are desired to be silica reinforced, with accompanying silica coupler, for use in tire treads.

It is considered that this invention is particularly applicable where it is desired that less silica be used in a tire tread elastomer composition, particularly for the aforesaid reasons, but it is desired to substantially retain the rubber composition physical properties attributed to the use of the more quantitative silica reinforcement.

According to this invention, it is believed to be a very substantial departure from past practice, for rubber tire treads, to replace at least a portion of the silica in a quantitatively silica reinforced tire tread elastomer composition by a low elastomer reinforcing carbon black instead of using a more conventional high reinforcing carbon black.

BRIEF DESCRIPTION OF THE DRAWING

For further description and understanding of this invention, reference is made to the accompanying Drawing.

The Drawing or FIGURE is a graphical presentation of various reinforcing carbon blacks and their individual designated ASTM N-classifications designated with reference to their Iodine Numbers (x axis) and DBP values (y axis).

Box A of the Drawing represents typical high reinforcing carbon blacks for reinforcing tire tread rubber as a box defining Iodine Numbers in a range of about 90 to about 150 g/kg and DBP absorption values in a range of about 90 to about 160 cc/100 gm.

Box B of the Drawing represents lower elastomer reinforcing carbon blacks in a box defining Iodine Numbers in a range of about 25 to about 85 g/kg and corresponding DBP absorption values in a range of 60 to 130, preferably to a maximum of 125, cc/100 gm.

Box C represents a low reinforcing carbon black for reinforcing tire tread rubber in a box defining having Iodine Numbers in a range of about 45 to about 80 g/kg and DBP absorption values in a range of 100 to 130, preferably to a maximum of 125, cc/100 gm.

The differentiation of the carbon blacks as depicted in Boxes A, B, and C in the Drawing graphically represents the differentiation between (i) carbon blacks that are considered to be high reinforcing carbon blacks for reinforcing tire tread rubber compositions, namely Box A, (ii) carbon blacks that are considered herein to be of less, or relatively inferior, reinforcing ability but uniquely useful for this invention insofar as silica replacement is concerned, namely Box B, and (iii) a preferable carbon black for use in this invention that is considered herein to be a low reinforcing carbon black for elastomer compositions for tire treads but uniquely useful for this invention insofar as silica replacement is concerned, namely Box C.

In summary, representative high reinforcing carbon blacks, namely carbon blacks within the boundary of Box A of the Drawing and understood herein to be normally be used for tire tread rubber compositions are, for example, carbon blacks having an ASTM designated number such as N110, N220, N299 and N347.

Representative of relatively low reinforcing carbon blacks, namely carbon blacks within the boundary of Box B of the Drawing and understood herein to not normally be used for tire tread rubber compositions are, for example, carbon blacks having an ASTM designated number such as N330, N326, N351, N550, N660 and N762.

Representative of low reinforcing carbon blacks, namely carbon blacks within the boundary of Box C of the Drawing and not believed to be normally used for rubber compositions for tire treads, nor for tire tread rubber compositions which are primarily silica reinforced (with attendant silica coupler), yet a desirable carbon black for the purposes of this invention, is, for example, a carbon black having an ASTM designated number of N351.

It is considered herein to be important to appreciate that the use of the indicated low reinforcing carbon blacks, particularly N351 carbon black, in a silica reinforced rubber composition for tire treads is believed to be a departure from a more common practice of using the high reinforcing carbon blacks for tire tread rubber compositions, particularly for rubber compositions containing silica reinforcement with an associated silica coupler.

The Iodine Number values are considered to be representative of carbon black surface area, or particle size, and elastomer reinforcement capability. The term "elastomer reinforcement" capability for high reinforcing carbon blacks typically provide elastomer compositions having higher 300 percent modulus, increased ultimate tensile strength and usually better DIN abrasion resistance than low reinforcing carbon blacks.

Thus, high reinforcing carbon blacks having higher Iodine Numbers, particularly Iodine Numbers in a range of about 90 to about 150 g/kg, have a smaller particle size and greater surface area and a greater elastomer reinforcing effect, or capability and, therefore, are generally considered to be more desirable for tire tread reinforcement, particularly where properties such as, for example, treadwear and tire handling are desired.

Conversely, relatively low reinforcing carbon blacks having Iodine Numbers in a range of about 25 to about 85, and particularly about 45 to about 80, g/kg are, in general, considered herein to be lower elastomer reinforcing carbon blacks and, therefore, relatively inadequate, as compared to high reinforcing carbon blacks, for providing superior reinforcement for elastomer compositions for tire treads. Indeed, such lower elastomer reinforcing carbon blacks are more typically used where such reinforcement is less critical as compared to tire treads such as, for example, elastomer compositions for tire sidewalls, tire carcass and wire coats.

Thus, the Iodine Number is considered herein to be a key property for describing the reinforcing capability of carbon black.

It is considered herein that an important aspect of the discovery is that specific low reinforcing carbon blacks can be used to reinforce elastomers, particularly sulfur vulcanizable elastomers which contain carbon-to-carbon double bonds, in a manner similar to silica (when silica is used with a silica coupling agent) yielding rubber compositions having attendant similar rubber composition properties for tire treads which are quantitatively reinforced with silica. As a result or benefit of such discovery, it has been observed herein that tire treads of rubber compositions can be provided which have, as compared to quantitatively silica reinforced rubber compositions (rubber compositions containing at least 25 phr of silica with a silica/carbon black weight ratio of at least 1/2), with substantially or relatively equal physical properties to the highly silica reinforced elastomer compositions such as, for example, hardness, hysteresis, modulus and abrasion resistance, but with a benefit of one or more of reduced granular reinforcement material cost and improved, or increased, rubber composition electrical conductivity.

Therefore, in one aspect of the invention, the rubber composition for the tire tread contains, as reinforcement, both precipitated silica and the defined low reinforcing carbon black with the required Iodine Number values. It is to be appreciated that, if desired, the low reinforcing carbon black can be used in combination with a high reinforcing carbon black, together with the silica, in a rubber composition for a tire tread.

In one aspect, such a rubber composition can be provided as being sulfur cured. The sulfur curing is accomplished in a conventional manner, namely by curing under conditions of elevated temperature and pressure for a suitable period of time.

In a further accordance with this invention, a rubber tire is provided having a tread of the rubber composition of this invention.

In the practice of this invention, as hereinbefore pointed out, the rubber composition is comprised of at least one diene-based elastomer, or rubber. Such elastomers are typically selected from homopolymers and copolymers of conjugated dienes and copolymers of conjugated diene(s) and vinyl aromatic compound such as, for example, styrene and alphamethylstyrene. Such dienes may, for example, be selected from isoprene and 1,3-butadiene and such vinyl aromatic compounds may be selected from styrene and alphamethylstyrene. Such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70–95 percent trans), low vinyl polybutadiene rubber (10–30 percent vinyl), medium vinyl polybutadiene rubber (30–50 percent vinyl) and high vinyl polybutadiene rubber (50–90 percent vinyl).

In one aspect, the rubber is preferably of at least two of diene based rubbers. For example, a combination of two or more rubbers is preferred such as cis 1,4-polyisoprene rubber (natural or synthetic, although natural is usually preferred), 3,4-polyisoprene rubber, isoprene/butadiene copolymer rubber, styrene/isoprene/butadiene rubber, emulsion and solution polymerization derived styrene/butadiene rubbers, cis 1,4-polybutadiene rubbers, medium vinyl polybutadiene rubbers (30–55 percent vinyl), high vinyl polybutadiene rubbers (55–90 percent vinyl) and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50%. In one aspect, the E-SBR may also contain acrylonitrile to form a terpolymer rubber, as E-SBAR, in amounts, for example, of about 2 to about 30 weight percent bound acrylonitrile in the terpolymer.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition.

The 3,4-PI and use thereof is more fully described in U.S. Pat. No. 5,087,668. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear.

Such BR can be prepared, for example, by organic solution polymerization of 1,3-butadiene.

The BR may be conveniently characterized, for example, by having at least a 90% cis 1,4-content.

The cis 1,4-polyisoprene and cis 1,4-polyisoprene natural rubber are well known to those having skill in the rubber art.

A styrene/isoprene/butadiene terpolymer elastomer (SIBR) may be used in rubber composition of this invention. Representative examples of various SIBR's may be found, for example, in U.S. Pat. Nos. 5,137,998, 5,159,020 and 5,272,220.

The commonly employed siliceous pigments used in rubber compounding applications can be used as the silica for this invention, including pyrogenic and precipitated siliceous pigments (silica), although precipitated silicas are preferred.

The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300, cc/100 gm.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc with, for example, designations of Zeosil 1165MP and silicas available from Degussa AG with, for example, designations VN2 and VN3, etc.

Numerous coupling agents are taught for use in combining silica and rubber such as, for example, silane based coupling agents containing a polysulfide component, or structure such as, for example, trialkoxyorganosilane polysulfides containing from about 2 to about 8 sulfur atoms in a polysulfide bridge such as, for example, bis-(3-triethoxysilylpropyl) tetrasulfide, trisulfide and/or disulfide.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of reinforcing type carbon blacks(s) are hereinbefore set forth.

Typical amounts of tackifier resins, if used, may comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which are usually comprised primarily of stearic acid, comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives, other than aspects of carbon black, silica and coupling agent, are not considered to be an aspect of the present invention which is more primarily directed to the utilization of specified blends of rubbers in rubber compositions, in combination with silica, coupling agents and defined low reinforcing carbon black, for use with silica in the reinforcement of the rubber, particularly for use in tire treads.

The rubber composition should be prepared by thermomechanically working and mixing the diene-based rubber, silica, carbon black and silica coupler, exclusive of the rubber curatives, with at least one mechanical mixer, usually referred to as "non-productive" mix stage(s), for a sufficient duration of time to promote the reaction of the included silica coupler between the silica and the diene-based elastomer(s), followed by a final mix stage in which the curatives, such as sulfur and accelerators, are added. The final mix stage is conventionally called the "productive" mix stage in which the mixing typically occurs at a maximum temperature which is lower that the maximum mixing temperature(s) of the preceding non-productive mixing stages. The terms "non-productive" and "productive" mix stages are well known to those having skill in the rubber mixing art.

In the practice of this invention, the following thermomechanical working and mixing procedure is preferred:

The rubber composition of this invention and, therefore, a rubber composition for the rubber tread of the tire of this invention, is preferably prepared by (a) thermomechanically working and mixing a mixture comprised of the said diene-based elastomer, silica, carbon black and silica coupler in at least two sequential mixing stages with at least one mechanical mixer, preferably selected from at least one internal mixer, open mill mixer and/or extruder, to (i) a maximum temperature in a range of about 160° C. to about 200° C. and for a duration of time, upon reaching said maximum temperature, in a range of about 1 to about 8 minutes at a temperature within about 5° C. to about 10° C. of said maximum temperature, or (ii) a maximum temperature in a range of about 155° C. to about 180° C. and for a duration of time, upon reaching said maximum temperature, in a range of about 4 to about 20 minutes at a temperature within about 5° C. to about 10° C. of said maximum temperature, followed by (b) mixing curatives, namely, sulfur and accelerator(s) with said mixture in a final mixing stage for about 1 to about 4 minutes to a temperature of about 90° C. to about 120° C.; whereas the rubber mixture is cooled to a temperature below about 40° C. between each of the aforesaid mix stages.

It is to be appreciated that the rubber composition is conventionally cooled to a temperature below about 40° C. between the aforesaid mix stages.

It is to further appreciated that the aforesaid duration of time for the required temperature maintenance for the mixing process(es) during the non-productive mix stages can be accomplished, for example, by (i) adjusting the motor speed of the mixer, namely reducing the motor speed after the desired temperature of the rubber composition is reached, in a variable speed mixer or by (ii) utilizing two or more mix stages sufficient to satisfy the duration requirement for the aforesaid maximum mixing temperature maintenance.

The rubber composition of this invention can be used for various purposes. For example, it can be used for tire treads. Such tires can be built, shaped, molded and cured by various methods which are known and will be readily apparent to those having skill in such art.

Carbon black properties such as Iodine Number and DBP oil absorption values are well known to those having skill in such art.

For example, the Iodine Number for carbon black is a measure of its surface area and is expressed in units of g/kg. A higher Iodine Number is indicative of smaller particle size which, in turn, is indicative of higher surface area for the carbon black and typically a higher reinforcing carbon black for elastomers.

The DBP (dibutylphthalate) absorption value for carbon black is a measure of its structure, or aggregate size and is expressed in cubic centimeters per 100 grams of carbon black. A higher DBP absorption value indicative of larger aggregates which, in turn, is indicative of higher structure for the carbon black. The DBP values are not as definitive for high reinforcing carbon blacks as the Iodine Number.

Iodine Numbers and DBP values together with representative ASTM designated N- numbers may be found, for example, in *The Vanderbilt Rubber Handbook, Thirteenth Edition* (1990), page 417.

It should be noted that while it is related on page 417 of the aforesaid *Vanderbilt Rubber Handbook* that a number of carbon blacks, namely high reinforcing carbon blacks, may reportedly be used in tire treads, lower reinforcing carbon black N351 is also included. It is considered herein, and insofar as the inventors are aware, such low reinforcing carbon black is used very little, if at all, in any passenger tire tread applications. In particular, insofar as it is known, low reinforcing carbon black has not been used, nor has been suggested for use, in a silica reinforced, particularly a quantitatively silica reinforced, rubber composition for tire treads. Indeed, it is considered herein that such use is a significant departure from past practice and is a significant discovery.

The invention may be better understood by reference to the following examples in which the parts and percentages are by weight unless otherwise indicated.

EXAMPLE I

In these Examples, silica reinforced rubber compositions, with attendant silica coupler, are provided to demonstrate the invention.

In this Example and the succeeding Examples, various high reinforcing carbon blacks and low reinforcing carbon blacks are used to replace a portion of the silica in a highly silica reinforced elastomer composition.

In particular, low reinforcing carbon blacks are used to replace at least a part of the silica reinforcement in rubber composition(s) to provide rubber compositions of substantially equivalent properties such as hardness and 300 percent modulus, as indicated by Shore A hardness and stress-strain measurements, hysteresis as indicated by rebound properties, Tan. delta (0° C.), and abrasion resistance as indicated by DIN abrasion values.

In each of such Examples, the control formulation composition is individually prepared and is used for comparison and is generated each time a series of experimental samples for the carbon black substitutions are prepared for purposes of consistency.

Accordingly, such control rubber compositions, are referred to in the various Examples as Ctrl 2, Ctrl 3, Ctrl 4, etc.

In particular, in this Example, a control rubber composition is provided which is quantitatively reinforced with silica and referenced herein as "Ctrl 1". The rubber composition was comprised of the ingredients shown in the following Table 1.

The rubber composition for this Example was prepared as a blend of emulsion polymerization prepared butadiene/ styrene copolymer elastomer (E-SBR), isoprene/butadiene copolymer rubber (IBR), cis 1,4-polybutadiene rubber (BR) and cis 1,4-polyisoprene natural rubber (NR).

The Control elastomer compositions were prepared by mixing the ingredients in several stages, namely, one non-productive stage (without the curatives) followed by a productive mix stage (for the curatives), then the resulting composition was cured under conditions of elevated temperature and pressure.

For the non-productive mixing stage, exclusive of the accelerator(s) and sulfur curatives which are mixed (added) in the final, productive mixing stage, the ingredients, including the elastomers, are mixed for 4 minutes to a temperature of about 160° C. and the motor speed of the mixer then slowed to maintain a substantially constant temperature of the elastomer composition of about 160° C. for an additional seven minutes. To the resulting rubber composition (mixture) was then mixed the curatives in a Banbury type mixer, namely, the accelerator(s) and sulfur to a maximum temperature of about 120° C. for about 3 minutes.

The resulting rubber composition was then vulcanized at a temperature of about 150° C. for about 18 minutes.

The rubber composition was comprised of the ingredients illustrated in Table 1. Table 2 illustrates properties of the cured rubber composition.

TABLE 1

| Sample # | Ctrl 1 |
| --- | --- |
| Non-Productive Mix Stages | |
| E-SBR[1] | 25 |
| IBR[2] | 45 |
| BR[3] | 20 |
| Natural Rubber[4] | 10 |
| Processing Oil[5] | 26.3 |
| Zinc Oxide | 2.5 |
| Fatty Acid | 3 |
| Antioxidant[6] | 3 |
| Silica[7] | 80 |
| Coupling Agent[8] | 12.8 |
| Productive Mix Stage | |
| Sulfur | 1.40 |
| Accelerators 1 & 2 Retarder | 3.5 |

[1] Emulsion polymerization prepared SBR having a styrene content of about 41 percent of the type obtainable as 1721 from the Huels AG company.
[2] Isoprene/butadiene copolymer rubber having an isoprene content of about 50 percent obtained from The Goodyear Tire & Rubber Company, and a Tg of about −43° C.
[3] Cis 1,4-polybutadiene rubber obtained as Budene® 1254 from The Goodyear Tire & Rubber Company.
[4] Natural rubber (cis 1,4-polyisoprene).
[5] Rubber processing oil as being 9.4 parts in the E-SBR and 5 parts in the PBd, where the amounts of E-SBR and PBd are reported above on a dry weight (without the oil) and in addition, about 11 parts additional rubber processing oil were added.
[6] Of the alkylaryl paraphenylene diamine type.
[7] A silica obtained as Zeosil ™ 1165MP from the Rhone-Poulenc company, and reportedly, having a BET surface area of about 165 and a DBP absorption value of about 260–280.
[8] a composition of bis-(3-triethoxysilylpropyl) tetrasulfide and N333 carbon black (50/50 weight ratio and, thus, considered as being 50 percent active) commercially available as X50S from Degussa.
[9] The accelerators were of the sulfenamide and diphenylguanidine type and the retarder was of the thiophthalimide type.

With reference to Box A of FIG. 1, typical high reinforcing carbon black, N-220, for tire tread rubber is used to partially replace the silica in the control rubber composition.

Three experimental samples of rubber compositions were prepared and vulcanized except that a portion of the silica reinforcement was replaced by a conventional high reinforcing tread carbon black, namely, N220 carbon black.

The following Table 2 illustrates the portions of the control formulation which was modified for these four experimental samples which themselves are identified herein as Exp A, Exp B and Exp C.

The silica coupling agent was reduced because of the reduction in amount of silica, with the ratio of coupler remaining the same. Also, the accelerators were reduced since the carbon black reinforced elastomer does not need as potent a cure system and, therefore, to make the overall vulcanized rubber compositions comparable.

TABLE 2

| | Ctrl 1 | Exp A | Exp B | Exp C |
| --- | --- | --- | --- | --- |
| Silica | 80 | 40 | 40 | 40 |
| Carbon Black (N220) | 0 | 40 | 30 | 25 |
| Coupling | 12.8 | 6.4 | 6.4 | 6.4 |

TABLE 2-continued

|  | Ctrl 1 | Exp A | Exp B | Exp C |
| --- | --- | --- | --- | --- |
| Agent | | | | |
| Accelerators (1 & 2) | 3.5 | 2.6 | 2.6 | 2.6 |
| Retarder | 0.1 | 0.4 | 0.4 | 0.4 |

The physical properties for the resulting vulcanized rubber compositions are shown in the following Table 3.

The DIN abrasion test is sometimes referred to as "DIN 53516" and is indicative of rubber wear due to abrasion. The DIN abrasion test is well known to those skilled in such art. A higher value is indicative of a larger amount of rubber removed by abrasion and, thus, a greater amount of wear for the rubber sample.

All of the rheometer minimum and maximum torque type measurements, the $T_{25}$ and $T_{90}$ cure time measurements (time to achieve 25 and 90 percent total cure, respectively), the tensile strength, elongation, 300% modulus and hot and cold rebound methods of rubber characterization are well known to those having skill in such art.

TABLE 3

| Sample # | Ctrl 1 | Exp A | Exp B | Exp C |
| --- | --- | --- | --- | --- |
| Rheometer (150° C.) | | | | |
| Max Torque, dNm | 20.2 | 18.7 | 15.8 | 14.8 |
| Min Torque, dNm | 2.9 | 3.5 | 2.7 | 2.4 |
| $T_{90}$, minutes | 12.9 | 12.2 | 12.9 | 13.4 |
| $T_{25}$, minutes | 6.9 | 5.2 | 6.0 | 6.7 |
| Stress - Strain | | | | |
| Tensile Strength, MPa | 16.5 | 17.2 | 18.1 | 17.8 |
| Elongation at Break, % | 500 | 530 | 630 | 650 |
| 300% Modulus, MPa | 9.7 | 9.6 | 7.7 | 6.9 |
| Rebound | | | | |
| 100° C., (%) | 61 | 54.0 | 57.0 | 59.6 |
| 23° C. | 35.8 | 29.6 | 33.9 | 36.8 |
| Hardness (Shore A) | | | | |
| 23° C. | 65.3 | 67.5 | 61.3 | 58.8 |
| 100° C. | 60 | 59.0 | 53.6 | 52.0 |
| DIN Abrasion | | | | |
| | 80 | 106.0 | 104.0 | 90.0 |
| Tan. Delta | | | | |
| at 0° C. | 0.168 | 0.148 | 0.165 | 0.182 |

Exp. A shows that the rebound values (100° C. and room temperature values) were significantly lower than the values for the Control (Ctrl 1). Lower rebound values indicate higher hysteresis for the rubber composition and is predictive of increased rolling resistance for a tire tread and, thus, lower vehicular fuel economy.

To increase the rebound values, reduced amounts of the high reinforcing N220 carbon black were used in Exp B and in Exp C. The rebound values for Exp B and Exp C were somewhat inferior to the rebound values for Ctrl 1. Also, the compound hardness and 300 percent modulus values for Exp B and Exp C were significantly lower than for either Exp A or Ctrl 1 which is believed herein to be predictive of reduced tire traction and handling. The DIN abrasion values were also inferior in all the experimental rubber compositions as compared to the Control rubber composition (Ctrl 1).

Thus, insofar as providing a tread rubber with enhanced rebound and stiffness properties, the partial substitution of the high reinforcing N220 reinforcing carbon black (taken from Box A of the Drawing) for the silica is considered herein to have been unsuccessful.

EXAMPLE II

With reference to Box B, and exclusive of Box C, of the Drawing, five additional lower reinforcing carbon blacks were evaluated as partial substitutions for the silica.

In particular, five experimental samples of rubber compositions were prepared and vulcanized according to Example I (with a freshly prepared control reported herein as Ctrl 2) except that a portion of the silica reinforcement was replaced by several relatively low reinforcing carbon blacks in a manner similar to Example II. The relatively low reinforcing carbon blacks were N330, N326, N550, N660 and N762 and the samples are referred to herein as Exp D, Exp E, Exp F, Exp G and Exp H, respectively.

The following Table 4 illustrates the portions of the silica and carbon black components of the control Exp A formulation which was modified for these five experimental samples.

As referenced in Example I, the silica coupling agent and accelerators were appropriately and similarly reduced.

TABLE 4

| | Ctrl 2 | Exp D | Exp E | Exp F | Exp G | Exp H |
| --- | --- | --- | --- | --- | --- | --- |
| Silica | 80 | 40 | 40 | 40 | 40 | 40 |
| CB (N330) | 0 | 40 | | | | |
| CB (N326) | 0 | | 40 | | | |
| CB (N550) | 0 | | | 40 | | |
| CB (N660) | 0 | | | | 40 | |
| CB (N762) | 0 | | | | | 40 |

The physical properties for the resulting vulcanized rubber compositions are shown in the following Table 5.

TABLE 5

| Sample # | Ctrl 2 | Exp D | Exp E | Exp F | Exp G | Exp H |
| --- | --- | --- | --- | --- | --- | --- |
| Rheometer (150° C.) | | | | | | |
| Max Torque, dNm | 12.9 | 14.5 | 13.9 | 11.7 | 12.2 | 13.6 |
| Min Torque, dNm | 2.2 | 2.5 | 2.3 | 2.1 | 1.7 | 1.9 |
| $T_{90}$, minutes | 10.2 | 6.7 | 8.3 | 7.4 | 7.9 | 8.8 |
| $T_{25}$, minutes | 5.1 | 2.7 | 3.7 | 1.9 | 3.7 | 4.3 |
| Stress-Strain | | | | | | |
| Tensile Strength, MPa | 17.3 | 16.7 | 18.0 | 15.6 | 15.2 | 16.0 |
| Elongation at Break, % | 550 | 480 | 570 | 530 | 540 | 410 |
| 300% Modulus, MPa | 7.7 | 11.0 | 9.2 | 9.2 | 8.8 | 10.6 |
| Rebound | | | | | | |
| 100° C. (%) | 56.8 | 58.1 | 56.8 | 58.5 | 64.0 | 63.6 |

TABLE 5-continued

| Sample # | Ctrl 2 | Exp D | Exp E | Exp F | Exp G | Exp H |
|---|---|---|---|---|---|---|
| 23° C. (%) Hardness (Shore A) | 37.6 | 36.2 | 35.6 | 42.0 | 44.8 | 43.3 |
| 23° C. | 58.7 | 61.1 | 60.6 | 56.7 | 55.0 | 57.9 |
| 100° C. | 53.2 | 57.3 | 54.5 | 52.3 | 51.8 | 54.9 |
| DIN Abrasion | | | | | | |
| | 111 | 100 | 108 | 96.0 | 121 | 107 |
| Tan. Delta | | | | | | |
| at 0° C. | 0.223 | 0.189 | 0.214 | 0.216 | 0.224 | 0.216 |

This Example shows that use of some types of carbon blacks to replace the silica can yield properties similar, although not exactly equal, to the control, although it is considered herein that small adjustments in carbon black levels would improve the results.

In particular, the DIN abrasion values show Exp. G to be slightly worse in its resistance to abrasion as compared to the control (Ctrl 2). The hardness values were also lower.

The Tan. delta values at 0° C. show that the relatively low reinforcing N330 carbon black (Exp. D) provided an elastomer composition with a slightly lower value than the control elastomer composition (Ctrl 2).

The elongation at break values show the Exp. H elastomer composition to be slightly less than the control elastomer composition.

EXAMPLE III

With reference to Box C of the Drawing, three experimental samples of rubber compositions were prepared and vulcanized according to Example I except that a portion of the silica reinforcement was replaced by low reinforcing N351 carbon black in a manner similar to Example I. The samples are referred to herein as Exp I and Exp J.

The following Table 6 illustrates the portions of the silica and carbon black components of the freshly prepared Control (Ctrl 3) formulation which was modified for these two experimental samples.

As referenced in Example II, the silica coupling agent and accelerators were appropriately and similarly reduced.

TABLE 6

| | Ctrl 3 | Exp. I | Exp. J |
|---|---|---|---|
| Silica | 80 | 41.5 | 0 |
| Carbon Black (N351) | 0 | 41.5 | 83.0 |

The physical properties for the resulting vulcanized rubber compositions are shown in the following Table 7.

TABLE 7

| Sample # | Ctrl 3 | Exp. I | Exp. J |
|---|---|---|---|
| Rheometer (150° C.) | | | |
| Max. Torque, dNm | 21.3 | 18.0 | 20.0 |
| Min. Torque, dNm | 3.4 | 3.4 | 3.6 |
| T$_{90}$, minutes | 12.7 | 10.9 | 11.4 |
| T$_{25}$, minutes | 6.3 | 5.1 | 6.7 |

TABLE 7-continued

| Sample # | Ctrl 3 | Exp. I | Exp. J |
|---|---|---|---|
| Stress-Strain | | | |
| Tensile Strength, MPa | 16.4 | 15.7 | 15.3 |
| Elongation at Break, % | 490 | 420 | 360 |
| 300% Modulus, MPa | 9.8 | 12.0 | 14.2 |
| Rebound | | | |
| 100° C., (%) | 57.7 | 58.7 | 54.1 |
| 23° C. (%) | 35.3 | 36.5 | 33.0 |
| Hardness (Shore A) | | | |
| 23° C. | 65.2 | 63.3 | 67.7 |
| 100° C. | 62.2 | 60.0 | 61.7 |
| DIN Abrasion | | | |
| | 108 | 85.0 | 84.0 |
| Tan. Delta | | | |
| at 0° C. | 0.169 | 0.200 | 0.174 |

This Example shows that the low reinforcing N351 carbon black, yielded compounding properties similar to the all silica compound on a 1 to 1 replacement; however, Exp J indicates that complete replacement of the silica with the low reinforcing N351 type of carbon black did not yield properties equal to the control.

In particular, the rebound and the elongation at break values of Exp J elastomer composition are significantly less than the Control (Ctrl 3) elastomer composition.

The blend of silica, N351 carbon black and silica coupler provided the best balance of rubber composition properties, namely a balance of the 300 percent modulus, rebound, Tan. delta (0° C.) and abrasion resistance values.

EXAMPLE IV

This Example is provided to demonstrate an effect of extended mixing times, using the low reinforcing N351 carbon black (Box C of the Drawing) as a partial replacement of the silica in the rubber composition of Example I.

Five experimental samples of rubber compositions were prepared and vulcanized according to Example I except that a portion of the silica reinforcement was replaced by low reinforcing N351 carbon black and the mixing time was varied.

In particular, the second non-productive mix step was held at about 160° C. for an additional 7 minutes by reducing the speed of the mixer after the temperature of the rubber reached 160° C. No additional mixing was used for Exp. M and Exp. O elastomer compositions.

The following Table 8 illustrates the experimental variables in mixing and rubber composition formulation.

As referenced in Example I, the silica coupling agent and accelerators were appropriately and similarly reduced.

TABLE 8

| | Ctrl 4 | Exp. L | Exp. M | Exp. N | Exp. O |
|---|---|---|---|---|---|
| Extended | | | | | |
| Mix Time | Yes | Yes | No | Yes | No |
| Silica | 80 | 40 | 40 | 20 | 20 |
| CB (N351) | 0 | 40 | 40 | 60 | 60 |

The physical properties for the resulting vulcanized rubber compositions are shown in the following Table 9.

TABLE 9

| Sample # | Ctrl 4 | Exp. L | Exp. M | Exp. N | Exp. O |
|---|---|---|---|---|---|
| Rheometer (150° C.) | | | | | |
| Max. Torque, dNm | 18.1 | 16.5 | 18.9 | 15.8 | 16.8 |
| Min. Torque, dNm | 3.0 | 2.9 | 3.1 | 3.4 | 3.2 |
| $T_{90}$, minutes | 14.5 | 11.2 | 13.1 | 10.3 | 12.4 |
| $T_{25}$, minutes | 7.2 | 5.1 | 6.0 | 5.1 | 6.0 |
| Stress-Strain | | | | | |
| Tensile Strength, MPa | 17.0 | 16.1 | 15.2 | 16.5 | 15.1 |
| Elongation at Break, % | 520 | 440 | 480 | 450 | 470 |
| 300% Modulus, MPa | 9.5 | 11.9 | 10.5 | 12.0 | 10.6 |
| Rebound | | | | | |
| 100° C. (%) | 59.6 | 59.8 | 54.3 | 57.7 | 53.5 |
| 23° C. (%) | 36.4 | 36.0 | 31.3 | 35.2 | 31.7 |
| Hardness (Shore A) | | | | | |
| 23° C. | 64.0 | 65.3 | 68.9 | 63.8 | 67.8 |
| 100° C. | 59.5 | 59.4 | 61.2 | 57.8 | 60.0 |
| DIN Abrasion | 100 | 93.0 | 102 | 89.0 | 99.0 |
| Tan. Delta | | | | | |
| at 0° C. | 0.211 | 0.206 | 0.174 | 0.205 | 0.176 |

This Example shows that reducing the silica level to 20 phr (Exp N), with the extended mixing, yielded a rubber composition with inferior rebound and hardness properties to 40 phr of silica (Exp L) and the Control (Ctrl 4).

Compositions without the extended mixing (Exps. M and O) have reduced rebound (poor for use for tire treads for fuel economy), lower Tan. delta at 0° C. (worse for use for tire treads for traction) and greater abrasion resistance (potentially worse for wear) compared to the same rubber composition with extended mixing (Exps. L and N), respectively.

EXAMPLE V

This Example is provided to show that, apparently, the selection of precipitated silica may vary considerably.

Two experimental samples of rubber compositions were prepared and vulcanized according to Example I except that a portion of the silica reinforcement was replaced by low reinforcing N351 carbon black (Box C of the Drawing) and, also the silica utilized in the previous Examples was replaced by Hi-Sil 210 from PPG Industries. The samples are referred to herein as Exp P and Exp Q.

The following Table 10 illustrates the portions of the silica and carbon black components of the Example I formulation which was modified for these three experimental samples.

As referenced in Example II, the silica coupling agent and accelerators were appropriately and similarly reduced.

TABLE 10

| | Exp. P | Exp. Q |
|---|---|---|
| Silica No. 1 | 40 | 0 |
| Silica No. 2 | 0 | 40 |
| Carbon black (N351) | 40 | 40 |

Silica No. 1 is Zeosil™ 1165MP obtained from the Rhone Poulenc company.

Silica No. 2 is obtained as Hi-Sil™ 210 from the PPG Industries company.

The physical properties for the resulting vulcanized rubber compositions are shown in the following Table 11.

TABLE 11

| Sample # | Exp. R | Exp. S |
|---|---|---|
| Rheometer (150° C.) | | |
| Max. Torque, dNm | 15.8 | 17.0 |
| Min. Torque, dNm | 2.8 | 3.0 |
| $T_{90}$, minutes | 13.6 | 15.5 |
| Stress-Strain | | |
| Tensile Strength, MPa | 15.4 | 14.7 |
| Elongation at Break, % | 440 | 430 |
| 300% Modulus, MPa | 11.1 | 11.1 |
| Rebound | | |
| 100° C., (%) | 58.0 | 59.3 |
| 23° C. (%) | 35.3 | 35.8 |
| Hardness (Shore A) | | |
| 23° C. | 62.4 | 63.5 |
| 100° C. | 57.4 | 59.5 |
| DIN Abrasion | 102 | 101 |
| Tan. Delta | | |
| at 0° C. | 0.195 | 0.201 |

This Example shows that the silica type did not affect the physical properties of the rubber composition when using the low reinforcing N351 carbon black as a partial replacement for the silica in the rubber composition.

In particular, the rebound, Tan. delta and DIN abrasion values were very similar or identical.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a tread of a rubber composition which comprises (A) about 100 parts by weight of at least one diene-based elastomer selected from homopolymers and copolymers of conjugated dienes and copolymers of conjugated diene(s) and vinyl aromatic compound, (B) about 50 to about 100 phr of particulate reinforcing filler composed of silica and carbon black wherein said filler consists of (i) about 25 to about 50 phr of silica consisting of precipitated silica and (ii) about 25 to about 50 phr particulate carbon black consisting essentially of carbon black having a DBP absorption value in a range of 60 to 125 cc/100 gm with a corresponding Iodine Number in a range of about 45 to about 85 g/kg, and (C) a coupling agent composition having a moiety characterized by being reactive with the surface of the silica and another moiety characterized by being interactive with elastomers having carbon-to-carbon double bonds.

2. The tire of claim 1 where, for said rubber composition, the diene based elastomer is selected from at least one of cis 1,4-polyisoprene rubber, 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70–95 percent trans), low vinyl polybutadiene rubber (10–30 percent vinyl), medium vinyl polybutadiene rubber (30–50 percent vinyl), high vinyl polybutadiene rubber (50–90 percent vinyl) and emulsion polymerization prepared styrene/butadiene/acrylonitrile terpolymer rubber.

3. The tire of claim 1 where, for said rubber composition, said silica is characterized by having a BET surface area in a range of about 50 to about 300 m²/g and a dibutylphthalate (DBP) absorption value in a range of about 150 to about 300 cc/100 g.

4. The tire of claim 1 where, for said rubber composition, said coupling agent is a trialkoxyorganosilane polysulfide containing from 2 to about 8 sulfur in its polysulfide bridge.

5. The tire of claim 1 where, for said rubber composition, said coupling agent is a bis-(3-triethoxysilylpropyl) tetrasulfide, trisulfide and/or disulfide.

6. The tire of claim 1 where, for said rubber composition, the carbon black is N-351 carbon black.

7. The tire of claim 2 where, for said rubber composition, the carbon black is N-351 carbon black.

8. The tire of claim 4 where, for said rubber composition, the carbon black is N-351 carbon black.

9. The tire of claim 5 where, for said rubber composition, the carbon black is N-351 carbon black.

10. The tire of claim 1 where, for said rubber composition, the carbon black is N-351 carbon black and the coupling agent is bis-(3-triethoxysilylpropyl) tetrasulfide, trisulfide and/or disulfide.

11. The tire of claim 1 where, for said tread, said rubber composition is prepared by (a) thermomechanically working and mixing a mixture comprised of the said diene-based elastomer, silica, carbon black and silica coupler with at least one mechanical mixer (i) to a maximum temperature in a range of about 160° C. to about 200° C. and for a duration of time, upon reaching said maximum temperature, in a range of about 1 to about 10 minutes at a temperature within about 5° C. to about 10° C. of said maximum temperature or (ii) to a maximum temperature in a range of about 155° C. to about 180° C. and for a duration of time, upon reaching said maximum temperature, in a range of about four to about 20 minutes at a temperature within about 5° C. to about 10° C. of said maximum temperature, followed by (b) mixing curatives with said mixture in a final mixing stage for about 1 to about 4 minutes to a temperature of about 90° C. to about 120° C.; whereas the rubber mixture is cooled to a temperature below about 40° C. between each of the aforesaid mix stages.

12. A tire where, the tread rubber composition is prepared according to claim 11 wherein the diene based elastomer is selected from at least one of cis 1,4-polyisoprene rubber, 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70–95 percent trans), low vinyl polybutadiene rubber (10–30 percent vinyl), medium vinyl polybutadiene rubber (30–50 percent vinyl), high vinyl polybutadiene rubber (50–90 percent vinyl) and emulsion polymerization prepared styrene/butadiene/acrylonitrile terpolymer rubber and butadiene/acrylonitrile copolymer rubber; and wherein said coupling agent is a triethoxyorganosilane polysulfide containing from 2 to about 8 sulfur atoms in its polysulfide bridge.

13. A tire where its tread rubber composition is prepared according to claim 11 wherein said silica is characterized by having a BET surface area in a range of about 50 to about 300 m²/g and a dibutylphthalate (DBP) absorption value in a range of about 150 to about 300 cc/100 g; and wherein said coupling agent is a triethoxyorganosilane polysulfide containing from about 2 to about 8 sulfur atoms in its polysulfide bridge.

14. The tire of claim 11 where, for the tread rubber composition, the carbon black is N-351 carbon black.

15. The tire of claim 12 where, for the tread rubber composition, the carbon black is N-351 carbon black.

16. The tire of claim 13 where, for the tread rubber composition, the carbon black is N-351 carbon black.

* * * * *